United States Patent
Saito et al.

(10) Patent No.: US 10,563,076 B2
(45) Date of Patent: Feb. 18, 2020

(54) INK JET RECORDING METHOD AND INK JET RECORDING APPARATUS

(71) Applicant: CANON KABUSHIKI KAISHA, Tokyo (JP)

(72) Inventors: Arihiro Saito, Saitama (JP); Kouhei Nakagawa, Tokyo (JP); Takashi Saito, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/028,516

(22) Filed: Jul. 6, 2018

(65) Prior Publication Data

US 2019/0010346 A1  Jan. 10, 2019

(30) Foreign Application Priority Data

Jul. 7, 2017 (JP) ................................. 2017-133625
Jun. 13, 2018 (JP) ................................. 2018-112736

(51) Int. Cl.

| C09D 11/322 | (2014.01) |
| B41J 2/14 | (2006.01) |
| C09D 11/38 | (2014.01) |
| C09D 11/107 | (2014.01) |
| C09D 11/102 | (2014.01) |

(52) U.S. Cl.
CPC ............. *C09D 11/38* (2013.01); *B41J 2/1433* (2013.01); *C09D 11/102* (2013.01); *C09D 11/107* (2013.01); *C09D 11/322* (2013.01)

(58) Field of Classification Search
CPC ....... C09D 11/40; C09D 11/322; C09D 11/54; B41J 2/2107

USPC .............................................. 347/47, 95, 100
See application file for complete search history.

(56) References Cited

U.S. PATENT DOCUMENTS

| 7,128,406 B2 | 10/2006 | Dixon et al. |
| 8,857,967 B2 | 10/2014 | Saito et al. |
| 9,371,461 B2 | 6/2016 | Saito et al. |
| 9,895,901 B2 | 2/2018 | Saito et al. |
| 2002/0118256 A1 | 8/2002 | Dixon et al. |

(Continued)

FOREIGN PATENT DOCUMENTS

JP    2007-118611 A    5/2007

*Primary Examiner* — An H Do
(74) *Attorney, Agent, or Firm* — Venable LLP

(57) ABSTRACT

An object of the present invention is to provide an ink jet recording method capable of exhibiting excellent ejection stability of ink even after recording an image over a long period of time, while recording an image having a high optical density. The ink jet recording method is a method of recording an image by ejecting ink from a recording head including an ejection orifice ejecting the ink, an ejection element generating energy for ejecting the ink, and first and second flow paths which communicate between the ejection orifice and the ejection element and in which the ink flows. The ink jet recording method includes an ejection step of ejecting the ink from the ejection orifice; and a flow step of flowing the ink in the first flow path to the second flow path separately from the ejection step, wherein the ink is aqueous ink containing a self-dispersible pigment in which an anionic group is bonded to a particle surface of the pigment directly or through another atomic group, and a nonionic surfactant, the self-dispersible pigment having a surface charge amount of 0.40 mmol/g or less.

19 Claims, 8 Drawing Sheets

(56) References Cited

U.S. PATENT DOCUMENTS

| | | | |
|---|---|---|---|
| 2004/0027404 A1* | 2/2004 | Nagashima | C09D 11/30 347/8 |
| 2016/0176192 A1* | 6/2016 | Fukumoto | B41J 2/1628 347/44 |
| 2018/0134907 A1 | 5/2018 | Saito et al. | |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

Recently, ink jet recording apparatuses are increasingly used in office printing and commercial printing fields. Further, in the ink jet recording apparatus, there is a need to further increase a recording speed and increase an optical density of an image to be recorded. In order to increase the recording speed, an ink jet recording method of recording an image in single pass by using a line type recording head (line head) is advantageous as compared to a multi-pass recording method performed using a serial type recording head according to the related art. Further, the optical density of the image can be increased by increasing an aggregation property of a pigment.

However, in the case of increasing the aggregation property of the pigment, it may be difficult to obtain reliability in view of a system. For example, ejection stability of ink or the like, may be deteriorated. Due to a configuration of the apparatus, the line head has a feature that it is difficult to perform a recovery operation from a nozzle in which ejection from a nozzle is paused or from a nozzle with a low ejection frequency. Particularly, even though there are nozzles with a low ejection frequency, it may be difficult to perform a preliminary ejection operation for preventing deterioration of ejection performance due to thickening of ink.

Meanwhile, in the case of recording an image in single pass by using the line head, since a difference in ejection volume between nozzles easily affects the image quality, there is a need to further improve the ejection stability of ink. For example, a recording head having a mechanism for flowing ink in the vicinity of an ejection orifice in order to suppress foreign materials from remaining in the nozzle has been suggested (Japanese Patent Application Laid-Open No. 2007-118611).

SUMMARY OF THE INVENTION

The present inventors investigated a case of recording an image in single pass by using a line head adopting the mechanism for flowing ink in the vicinity of the ejection orifice, suggested in Japanese Patent Application Laid-Open No. 2007-118611, in order to further increase a recording speed and increase an optical density of an image. As a result, it could be appreciated that ejection stability can be improved even in the case of using ink of which an aggregation property of a pigment is increased. However, it was proved that ejection stability is improved in a short term, but in the case of recording an image over a long period of time, a decrease in ejection amount, non-ejection or the like, is likely to occur.

An object of the present invention is to provide an ink jet recording method capable of exhibiting excellent ejection stability of ink even after recording an image over a long period of time, while recording an image having a high optical density. Another object of the present invention is to provide an ink jet recording apparatus used in the ink jet recording method described above.

That is, according to the present invention, there is provided an ink jet recording method of recording an image by ejecting ink from a recording head including an ejection orifice ejecting the ink, an ejection element generating energy for ejecting the ink, and first and second flow paths which communicate between the ejection orifice and the ejection element and in which the ink flows, the ink jet recording method including: an ejection step of ejecting the ink from the ejection orifice; and a flow step of flowing the ink in the first flow path to the second flow path separately from the ejection step, wherein the ink is aqueous ink containing a self-dispersible pigment in which an anionic group is bonded to a particle surface of the pigment directly or through another atomic group, and a nonionic surfactant, the self-dispersible pigment having a surface charge amount of 0.40 mmol/g or less.

According to the present invention, the ink jet recording method exhibiting excellent ejection stability of ink even after recording an image over a long period of time, while recording an image having a high optical density can be provided. Further, according to the present invention, the ink jet recording apparatus used in the ink jet recording method can be provided.

Further features of the present invention will become apparent from the following description of exemplary embodiments with reference to the attached drawings.

DESCRIPTION OF THE EMBODIMENTS

Hereinafter, the present invention will be described in detail with reference to preferred embodiments thereof. In the present invention, when a compound is a salt, in the ink, the salt is dissociated into ions, but for convenience, this ink is expressed as "containing a salt". Aqueous ink for ink jet is also simply referred to as "ink". The first and second flow paths are also collectively referred to as "flow paths". Unless otherwise described, physical properties values are values at room temperature (25° C.).

<Ink Jet Recording Method and Ink Jet Recording Apparatus>

An ink jet recording apparatus according to the present invention includes a recording head including an ejection orifice ejecting the ink, an ejection element generating energy for ejecting the ink, and first and second flow paths which communicate between the ejection orifice and the ejection element and in which the ink flows. Further, the ink jet recording apparatus according to the present invention includes a flowing unit flowing the ink in the first flow path to the second flow path separately from the ejection element. Further, the ink jet recording method according to the present invention is, for example, a method of recording an image by ejecting ink from the recording head using the ink jet recording apparatus described above. That is, the ink jet recording method according to the present invention includes an ejection step of ejecting the ink from the ejection orifice, and a flow step of flowing the ink in the first flow path to the second flow path, separately from the ejection step.

Figure 1:
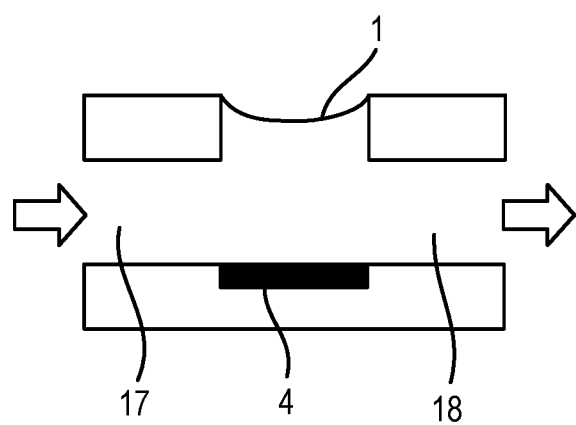
FIG. 1 is a schematic view illustrating an example of a recording head.

FIG. 1 is a schematic view illustrating an example of a recording head. The recording head illustrated in FIG. 1 includes an ejection orifice 1 ejecting ink, an ejection element 4 generating energy for ejecting the ink, and first and second flow paths 17 and 18 which communicate between the ejection orifice 1 and the ejection element 4 and in which the ink flows. The ink flows from the first flow path 17 to the second flow path 18 (in an arrow direction in FIG. 1) while passing between the ejection orifice 1 and the ejection element 4. When the ink is not flowing, evaporation of water from a meniscus of the ejection orifice 1 proceeds, and thus the ink existing between the ejection orifice 1 and the ejection element 4 is slowly thickened. For this reason, when an ejection pause time is long, at the time of performing a next ejection operation, fluid resistance of the ink increases, and thus it may be difficult to eject the ink. On the contrary, when the ink is flowing in the arrow direction in FIG. 1, even in the case in which water is evaporated from the meniscus, since the ink is continuously supplied between the ejection orifice 1 and the ejection element 4 due to a circulation flow, thickening of the ink is suppressed and it is difficult to generate a state in which ejection is difficult.

As described above, ejection stability of the ink, which corresponds to a problem particularly in the case of using a line head, can be improved by performing the flow step of flowing the ink in the first flow path 17 to the second flow path 18, separately from the ejection step of ejecting the ink from the ejection orifice 1. However, it was proved that even in the case of performing the flow step as described above, there is a novel problem that when recording is performed over a long period of time using ink of which an aggregation property is improved in order to increase an optical density, a phenomenon such as a decrease in ejection amount or non-ejection is likely to occur. It is estimated that this phenomenon is generated by a mechanism described below.

Figure 2A:
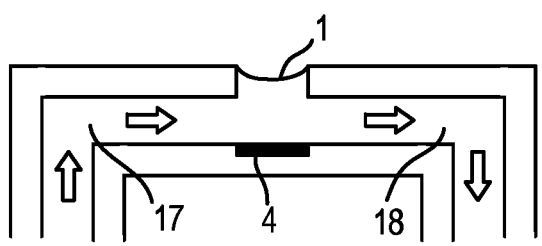
FIGS. 2A and 2B are schematic views for explaining the flow state of the ink in the recording head.
Figure 2B:
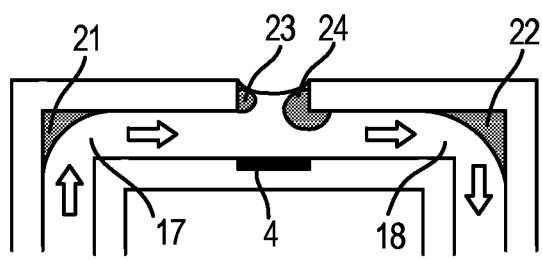

FIGS. 2A and 2B are schematic views for explaining a flow state of ink in the recording head. As illustrated in FIG. 2A, in the recording head immediately after use, the ink flows from the first flow path 17 to the second flow path 18 instead of substantially stagnating therein. However, in the case of using the recording head for a long period of time while flowing the ink, as illustrated in FIG. 2B, solid components such as a pigment or a water-soluble organic solvent in the ink is likely to be accumulated in portions such as corner portions 21 and 22 in which the ink becomes easily stagnant, and as a result, the ink is thickened. Further, the thickening of the ink proceeds due to drying and stagnation in ink stagnation portions 23 and 24 in the vicinity of the meniscus of the ejection orifice 1. Further, in long-term use, the thickening of the ink further proceeds from the corner portions 21 and 22, and at the same time, a thickened product flows in the flow paths from the ink stagnation portions 23 and 24. It is thought that repetition of the above-mentioned step results in a decrease in flow rate or ejection amount of the ink and adhesion of the ink, such that non-ejection of the ink is generated.

The present inventors investigated a composition of the ink in order to solve the new problem occurring in the recording method including the flow step of the ink. As a result, it was found that it is possible to record an image having a high optical density and improve ejection stability of the ink even after recording images over a long period of time by allowing the ink to have the following composition. That is, in the ink jet recording method according to the present invention, aqueous ink containing a self-dispersible pigment in which an anionic group is bonded to a particle surface of the pigment directly or through another atomic group, and a nonionic surfactant is used. In addition, as the self-dispersible pigment, a self-dispersible pigment having a surface charge amount of 0.40 mmol/g or less is used. The present inventors inferred the reason by which the above-mentioned problem is solved by such a configuration as follows.

The self-dispersible pigment in which an anionic group is bonded to a particle surface of the pigment directly or through another atomic group is dispersed in an aqueous medium by electrostatic repulsive force generated by the anionic group forming an electric double layer. Cations are present in the vicinity of the anionic groups as counterions. In the ink in a state in which water is not evaporated, since a concentration of cations is low and the cations do not have an influence on the electric double layer formed by the anionic group, a dispersion state of the pigment is stably maintained. When water in the ink is decreased by evaporation or the like, since the concentration of the cations is increased, electrostatic repulsive force is lost by compressing the electric double layer, such that the pigment is aggregated.

The surface charge amount of the self-dispersible pigment is an index indicating an amount of the anionic group per unit mass of the pigment. In a self-dispersible pigment having a small surface charge amount, that is, a small number of anionic groups, an amount of cation present in the vicinity thereof is also small, such that the self-dispersible pigment tends to be hardly aggregated. In addition, a portion (hydrophobic portion) that is not covered with a functional group (anionic group, a group in which another atomic group and an anionic group are bonded to each other) is present in the particle surface of the self-dispersible pigment having a small number of anionic groups. A hydrophobic portion of the nonionic surfactant is easily adsorbed in this hydrophobic portion by hydrophobic interactions. In the self-dispersible pigment in which the nonionic surfactant is adsorbed, the number of anionic groups is originally small, and a tendency to aggregate is also decreased, such that aggregation of the self-dispersible pigment in which the nonionic surfactant is adsorbed is more difficult, and a formed aggregate becomes soft.

Due to the above-mentioned reason, the ink containing the self-dispersible pigment having a surface charge amount of 0.40 mmol/g or less, and the nonionic surfactant is used, such that the aggregation property of the pigment is not excessively increased, but can become moderate. Further, as the nonionic surfactant is adsorbed in a hydrophobic particle surface of the pigment, aggregation in the corner portions or stagnation portions is alleviated, and the aggregate becomes soft, such that thickening or adhesion of the ink is suppressed. Further, the pigment is suitably aggregated, such that an optical density of an image to be recorded can be increased.

Meanwhile, a large amount of cation corresponding to counterions of anionic groups is present around the self-dispersible pigment having a large surface charge amount, that is, a large number of anionic groups. For this reason, when the concentration of the cations is increased with a decrease in content of water, the electric double layer is easily compressed, such that aggregation tends to easily occur. Further, since functional groups are densely present on the particle surface of the self-dispersible pigment having a large number of anionic groups, the nonionic surfactant cannot be adsorbed. For this reason, when the surface charge amount of the self-dispersible pigment is more than 0.40 mmol/g, since the aggregation property of the pigment is excessively increased, and the formed aggregate does not become soft, the optical density of the image is increased, but ejection stability of the ink becomes insufficient.

In the case of using a pigment dispersed by a dispersant such as a resin or a surfactant instead of the self-dispersible pigment, since an aggregation property of the pigment is low, the ink is easily thickened by interactions between the dispersants, and a flow rate is easily decreased, such that ejection stability of the ink becomes insufficient. In addition, since the pigment is easily immersed together with a liquid component in a recording medium, in some cases, it is impossible to increase the optical density. Further, in the case of using an ionic surfactant such as an anionic surfactant instead of the nonionic surfactant, since the surfactant cannot be adsorbed in the hydrophobic portion of the self-dispersible pigment due to interactions with the anionic group of the self-dispersible pigment or the cations present around the self-dispersible pigment, ejection stability of the ink becomes insufficient.

Figure 3:
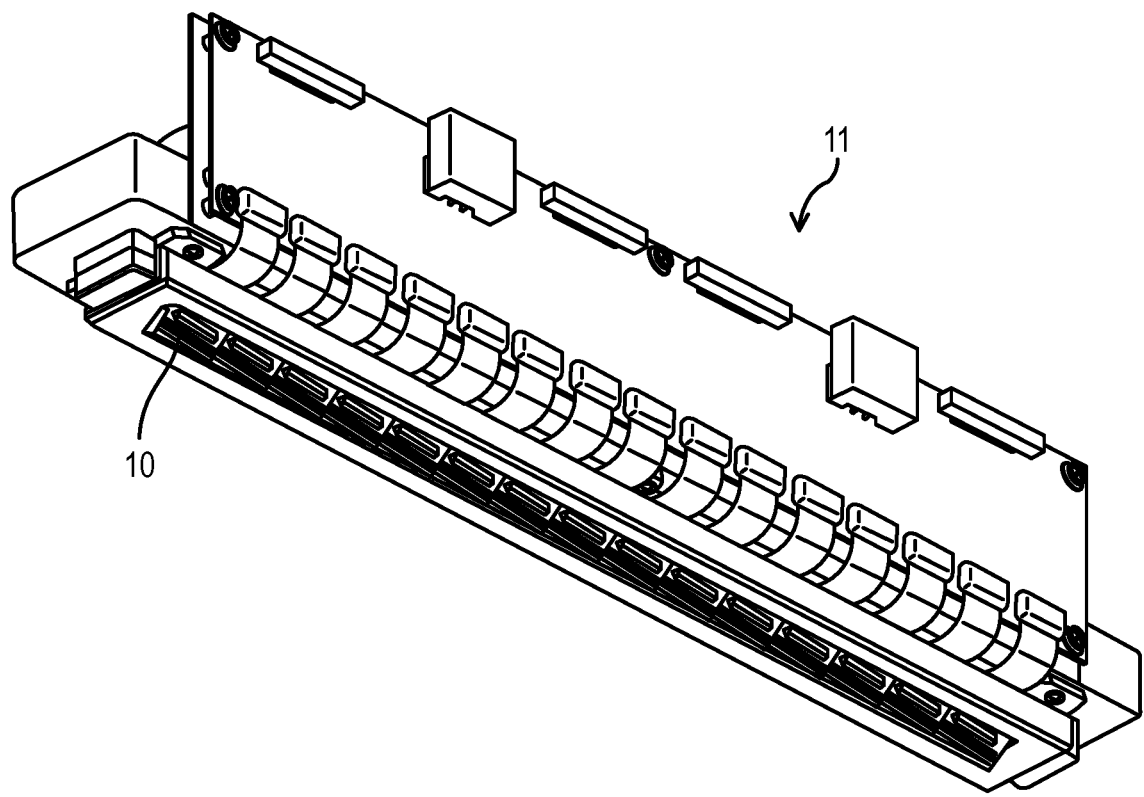
FIG. 3 is a perspective view illustrating an example of a line head.

FIG. 3 is a perspective view illustrating an example of a line head. As illustrated in FIG. 3, an ejection element substrate 10 in which ejection orifice arrays are disposed is arranged in a linear shape in the line head 11. In the ejection element substrate 10, for example, ejection orifice arrays corresponding to respective inks such as cyan, magenta, yellow and black (CMYK) inks are arranged.

Figure 4:
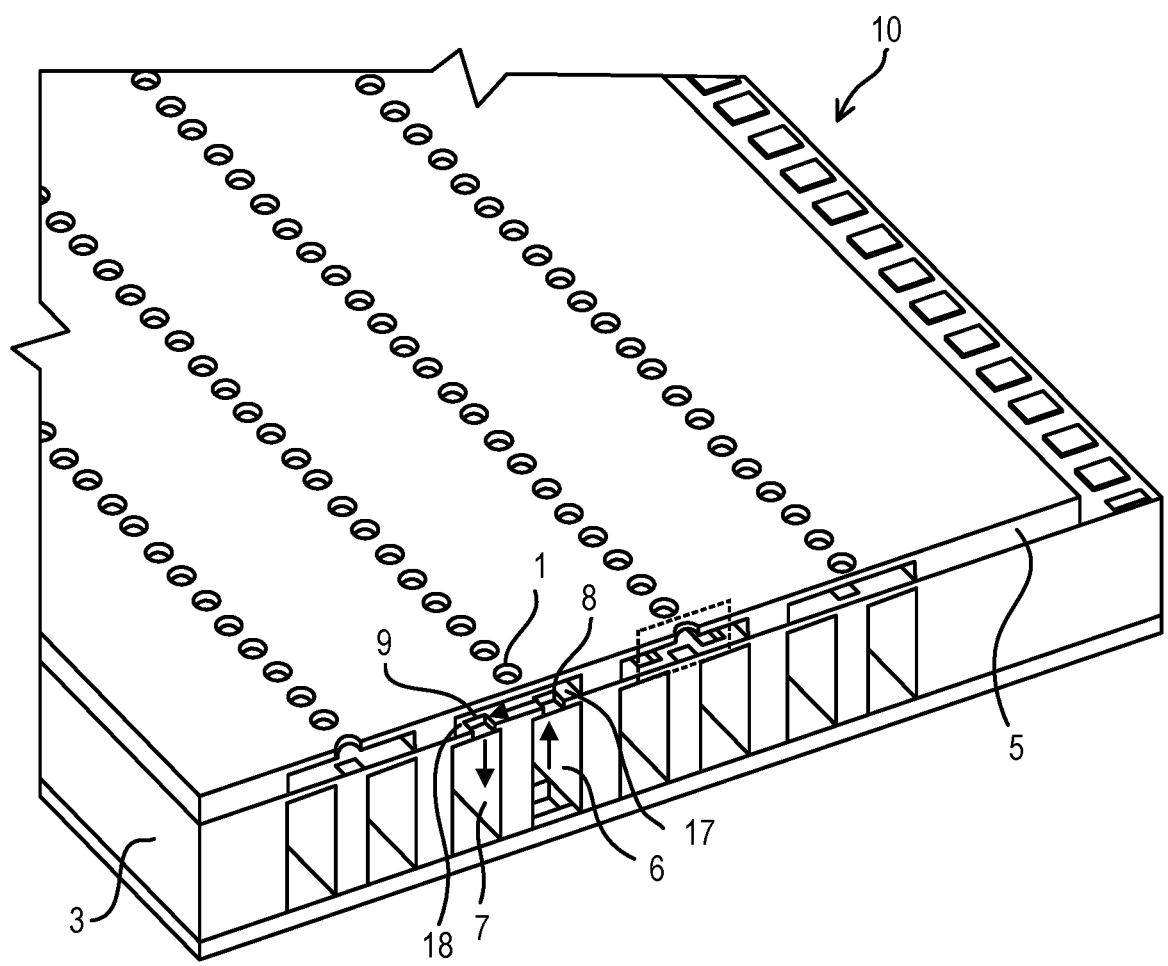
FIG. 4 is a perspective view illustrating a cross section of an ejection element substrate.

FIG. 4 is a perspective view illustrating a cross section of the ejection element substrate. As illustrated in FIG. 4, the ejection element substrate 10 includes an ejection orifice formation member 5 in which the ejection orifice 1 is formed and a substrate 3 in which the ejection element (not illustrated) is disposed. The ejection orifice formation member 5 and the substrate 3 are stacked, such that the first and second flow paths 17 and 18 in which the ink flows are formed. The first flow path 17 is a region from an inlet 8 through which the ink in an inlet path 6 is introduced to a portion between the ejection orifice 1 and the ejection element. Further, the second flow path 18 is a region from the portion between the ejection orifice 1 and the ejection element to an outlet 9 through which the ink is discharged to an outlet path 7. For example, when there is a difference in pressure between the inlet 8 and the outlet 9 such as an inlet 8 having a high pressure and an outlet 9 having a low pressure, the ink can flow from a portion at which the pressure is high to a portion at which the pressure is low (in an arrow direction in FIG. 4). The ink that passed through the inlet path 6 and the inlet 8 goes into the first flow path 17. In addition, the ink that passed through the portion between the ejection orifice 1 and the ejection element flows to the outlet path 7 through the second flow path 18 and the outlet 9.

The flow step of flowing the ink in the first flow path to the second flow path is a separate (different) step from the ejection step of ejecting the ink from the ejection orifice. Further, it is preferable that a flow of the ink from the first flow path to the second flow path in the flow step is performed separately from filling of the ink between the ejection orifice and the ejection element. It is preferable that the flow step is a step of flowing the ink in the first flow path to the second flow path without discharging the ink from the ejection orifice. Discharge of the ink from the ejection orifice includes recovery operations such as preliminary ejection or suction. During a recovery action of the recording head, a flow of the ink from the first flow path to the second flow path may be stopped. Further, in the flow step, it is preferable to flow the ink from the first flow path to the second flow path by a flowing unit separately from the ejection element.

Hereinafter, a case of using a thermal type recording head generating bubbles to eject ink using an ejection element generating thermal energy will be described by way of example in order to describe the ink jet recording method and the ink jet recording apparatus according to the present invention in more detail. However, a piezo type recording head, or a recording head adopting another ejection method can also be applied to the ink jet recording method and the ink jet recording apparatus according to the present invention. Hereinafter, a case in which the ink is circulated between an ink storage portion and the recording head is described by way of example, but another case may also be applied. For example, two ink storage portions may be provided on upstream and downstream sides of the recording head, and ink may flow from one ink storage portion to another ink storage portion. Further, a line head in which the ejection element substrate capable of ejecting four color inks (CMYK) is linearly arranged will be described by way of example, but a line head in which ejection element substrates corresponding to four color inks, respectively, are provided can also be used. In addition, as a recording head other than the line head, a serial head recording an image while scanning can also be used. In the present invention, it is particularly preferable to use the line head ejecting ink in a thermal method.

Figure 5:
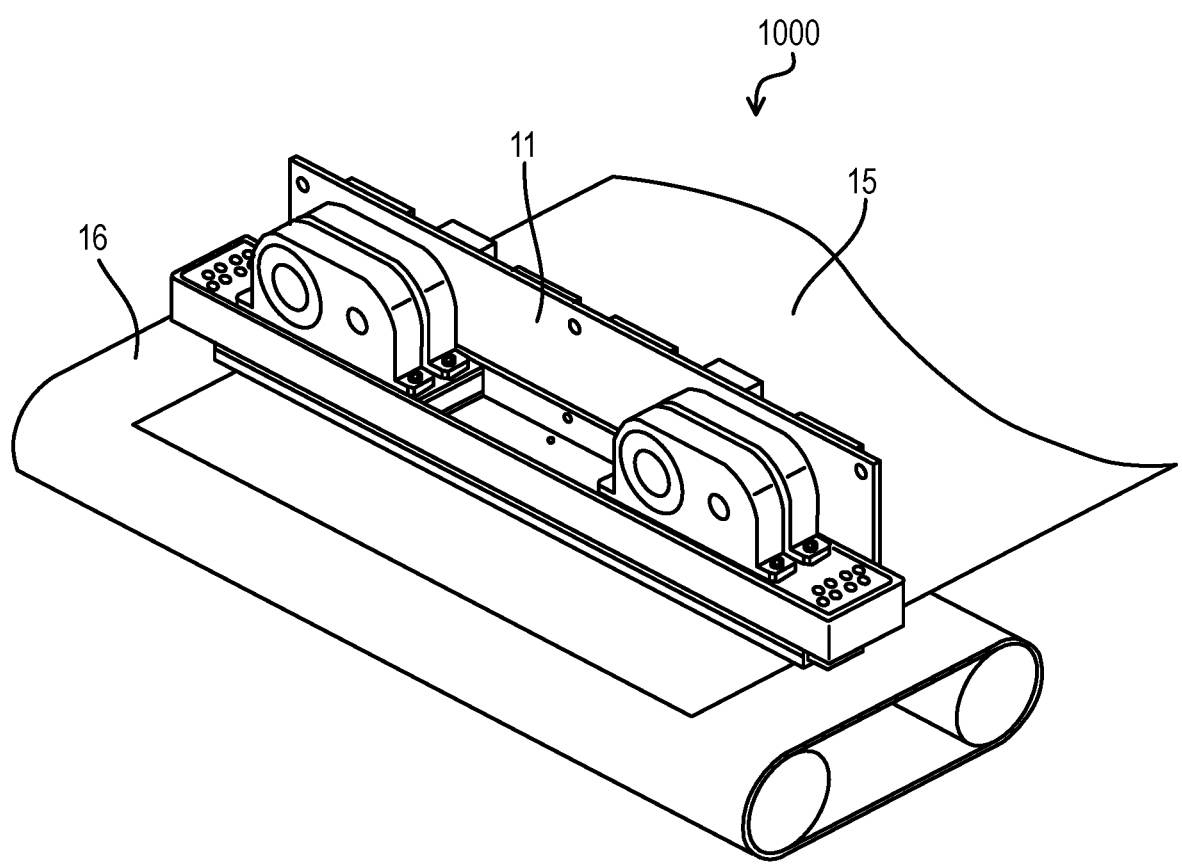
FIG. 5 is a perspective view illustrating main portions of an ink jet recording apparatus.

FIG. 5 is a perspective view illustrating main portions of an ink jet recording apparatus. An ink jet recording apparatus 1000 illustrated in FIG. 5 includes a conveyance portion 16 conveying a recording medium 15 and a line head 11 disposed to be orthogonal to a conveyance direction of the recording medium. The ink jet recording apparatus 1000 includes a line head 11 recording an image while continuously or intermittently conveying a plurality of recording media 15. As the recording medium 15, roll paper as well as cut paper can also be used. As the recording medium, any recording medium may be used. Among them, paper having permeability, for example, a recording medium having no coating layer such as plain paper or non-coated paper and a recording medium having a coating layer such as a glossy paper or an art paper is preferably used.

Figure 6:
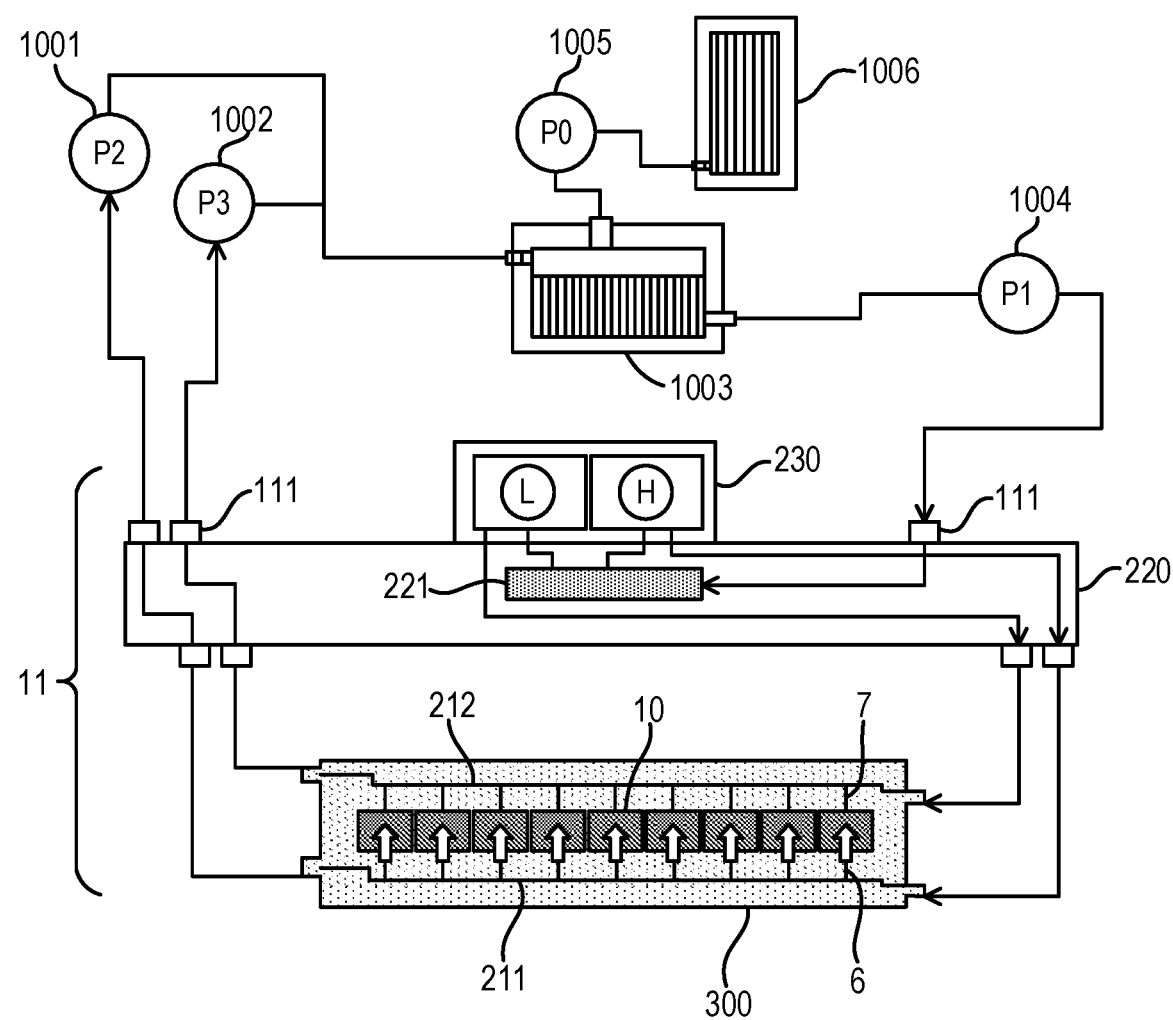
FIG. 6 is a schematic view illustrating a supply system of ink.

In the flow step, it is preferable to continuously or intermittently flow the ink. Hereinafter, a method of continuously or intermittently flowing the ink will be described in detail. First, the method of continuously flowing the ink will be described with reference to FIG. 6. FIG. 6 is a schematic view illustrating a supply system of ink. A line head 11 illustrated in FIG. 6 is connected to a first circulation pump (high pressure side) 1001, a first circulation pump (low pressure side) 1002, a buffer tank 1003 and a second circulation pump 1004. Although only a flow path for one color ink is illustrated in FIG. 6 in order to simplify the description, actually, flow paths for four colors of CMYK are provided in the line head 11, respectively.

The buffer tank 1003 connected to a main tank 1006 corresponding to the ink storage portion has an air circulation hole (not illustrated) and can discharge bubbles in the ink to the outside. The buffer tank 1003 is also connected to a replenishment pump 1005. The ink is ejected (discharged) from the ejection orifice at the time of image recording and suction recovery, such that the ink is consumed in the line head 11. The replenishment pump 1005 conveys an amount of ink corresponding to a consumption amount from the main tank 1006 to the buffer tank 1003.

The first circulation pump (high pressure side) 1001 and the first circulation pump (low pressure side) 1002 flow the ink in the line head 11 discharged from a liquid connection portion 111 to the buffer tank 1003. As the first circulation pump, it is preferable to use a positive displacement pump having quantitative liquid pumping capacity. Specific examples of this positive displacement pump can include a tube pump, a gear pump, a diaphragm pump, a syringe pump and the like. At the time of driving an ejection unit 300, the ink can be allowed to flow in a common inlet path 211 and a common outlet path 212 by the first circulation pump (high pressure side) 1001 and the first circulation pump (low pressure side) 1002.

A negative pressure control unit 230 includes two pressure adjustment mechanisms in which different control pressures are set. A pressure adjustment mechanism (high pressure side) H and a pressure adjustment mechanism (low pressure side) L are connected to the common inlet path 211 and the common outlet path 212 in an ejection unit 300, respectively, through a supply unit 220 provided with a filter 221 removing foreign materials from the ink. In the ejection unit 300, the common inlet path 211, the common outlet path 212 and the inlet path 6 and the outlet path 7 which are in communication with the ejection element substrate 10 are provided. Since the inlet path 6 and the outlet path 7 are in communication with the common inlet path 211 and the common outlet path 212, a partial flow (an arrow in FIG. 6) of ink from the common inlet path 211 to the common outlet path 212 through an internal flow path of the ejection element substrate 10 is generated. The flow of the ink in the internal flow path in the ejection element substrate 10 is indicated by the arrow in FIG. 4. That is, as illustrated in FIG. 4, the ink in the first flow path 17 passes between the ejection orifice 1 and the ejection element to flow to the second flow path 18.

As illustrated in FIG. 6, since the pressure adjustment mechanism H is connected to the common inlet path 211 and at the same time, the pressure adjustment mechanism L is connected to the common outlet path 212, a difference in pressure between the inlet path 6 and the outlet path 7 is generated. Therefore, a difference in pressure between the inlet 8 (FIG. 4) which is in communication with the inlet path 6 and the outlet 9 (FIG. 4) which is in communication with the outlet path 7 is also generated. In the case of flowing the ink due to the difference in pressure between the inlet 8 and the outlet 9, it is preferable to control a flow rate (mm/s) of the ink to be 0.1 mm/s or more to 10.0 mm/s or less.

In the ink jet recording method according to the present invention, even during a recovery operation of the recording head, the ink in the first flow path may be flowed to the second flow path. When the ink flows during the recovery operation of the recording head, the ink constantly flows. When the ink constantly flows, evaporation of water easily occurs, such that a concentration of circulating ink is likely to be increased. In order to suppress the concentration of the ink from being increased, it is preferable that a mechanism for adding water to the ink with the passage of time is provided in the ink jet recording apparatus. Further, it is preferable that a detector detecting the concentration of the ink is disposed in the ink jet recording apparatus and water is added to the ink in sync with an increase in concentration of the ink to be detected.

Figure 7A:
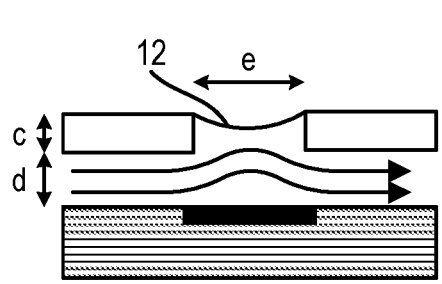
FIGS. 7A and 7B are schematic views for explaining a flow state of the ink in the vicinity of the ejection orifice.
Figure 7B:
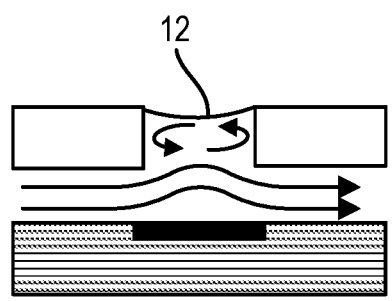

FIGS. 7A and 7B are schematic views for explaining a flow state of ink in the vicinity of an ejection orifice. The flow state of the ink in the vicinity of the ejection orifice is roughly divided into two types. The first is a flow state in which a circulation flow is not formed in the vicinity of a meniscus 12 of the ejection orifice as illustrated in FIG. 7A. The second is a flow state in which a circulation flow is formed in the vicinity of the meniscus 12 of the ejection orifice as illustrated in FIG. 7B. Even though the ink in the flow path has the same flow rate, the flow state of the ink in the vicinity of the meniscus 12 may not be constant. It is thought that the flow state of the ink depends on a thickness c of the ejection orifice formation member, a height d of the flow path and a diameter e of the ejection orifice rather than the flow rate of the ink in the flow path. For example, in the case in which a height d of flow path and a diameter e of the ejection orifice are the same as each other, when a thickness c of the ejection orifice formation member is large, the circulation flow is easily formed in the vicinity of the meniscus 12 as illustrated in FIG. 7B.

Figure 8:
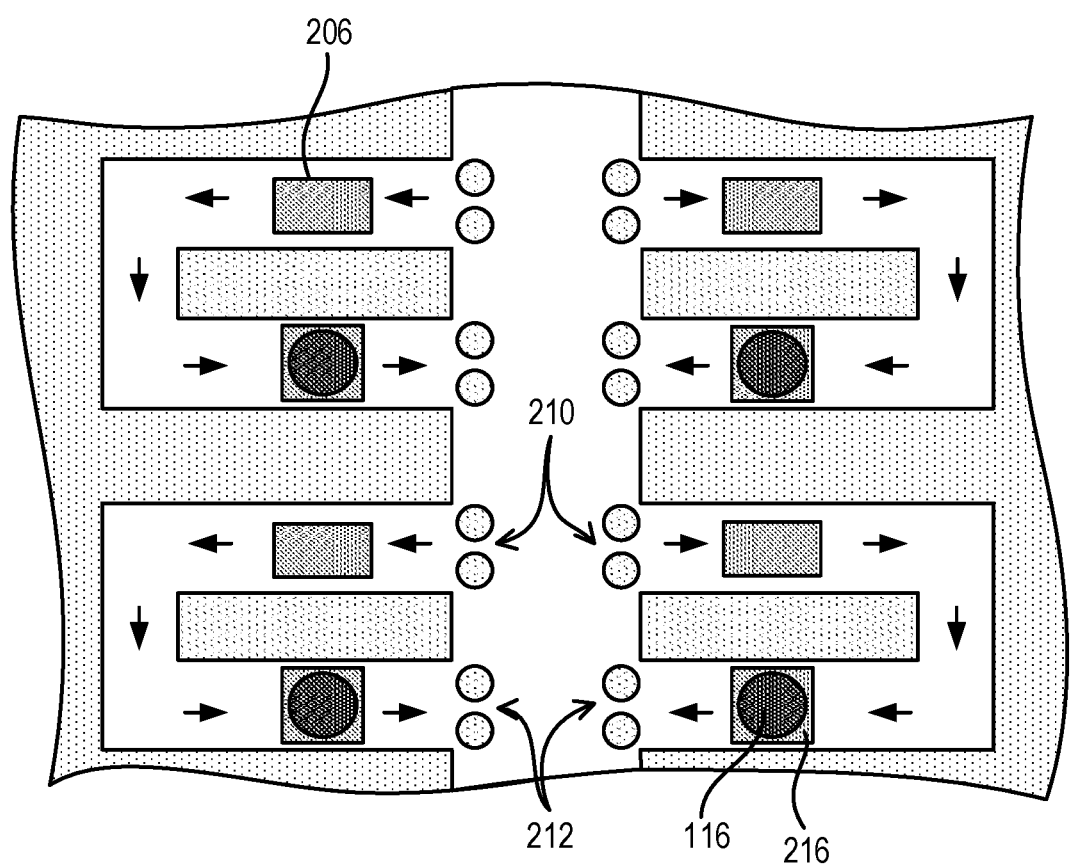
FIG. 8 is a cross-sectional view partially illustrating an example of the line head.

Next, a method of intermittently flowing ink will be described with reference to FIG. 8. FIG. 8 is a cross-sectional view partially illustrating an example of the line head. As illustrated in FIG. 8, the ink introduced from the inlet 210 flows in an arrow direction by an action of a circulation pump 206 corresponding to a flowing unit of the ink to thereby be discharged from the outlet 212. Further, the circulation pump 206 is a pump capable of intermittently flowing the ink. For this reason, the ink can intermittently flow between an ejection orifice 116 and an ejection element 216 by driving the circulation pump 206. In the case of intermittently flowing the ink, it is preferable to control a flow rate (m/s) of the ink to be 1.0 m/s or more to 10.0 m/s or less.

<Ink>

The ink used in the ink jet recording method and the ink jet recording apparatus according to the present invention is aqueous ink for ink jet, containing the self-dispersible pigment and the nonionic surfactant. Hereinafter, respective components constituting the ink or physical properties of the ink will be described in detail.

(Self-Dispersible Pigment)

A coloring material contained in the ink is a self-dispersible pigment in which an anionic group is bonded to a particle surface of the pigment directly or through another atomic group. Specific examples of the pigment can include inorganic pigments such as carbon black and titanium oxide and organic pigments such as azo, phthalocyanine, quinacridone, isoindolinone, imidazolone, diketopyrrolopyrrole, dioxazine and the like. Among them, carbon black is preferable. A content (% by mass) of the self-dispersible pigment in the ink is preferably 0.10% by mass or more to 10.0% by mass or less based on a total mass of the ink.

Examples of the anionic group can include —COOM, —$SO_3M$, —$PO_3M_2$ and the like. Ms are each independently a hydrogen atom; an alkali metal; ammonium ($NH_4$) or organic ammonium. Examples of another atomic group (—R—) can include an alkylene group; an arylene group; an amide group; a sulfonyl group; an imino group; a carbonyl group; an ester group; an ether group and group obtained by combining these groups and the like. Among them, a self-dispersible pigment in which —COOM or —$C_6H_3$—(COOM)$_2$ is bonded to the particle surface of the pigment is preferable. Particularly, in a self-dispersible pigment in which the anionic group such as a carboxylic acid group is directly bonded to the particle surface of the pigment, steric hindrance by functional groups bonded to the particle surface of the pigment is small as compared to a self-dispersible pigment in which the anionic group is bonded thereto through another atomic group. For this reason, the nonionic surfactant can be efficiently adsorbed in the particle surface of the pigment, and an effect of suppressing aggregation in the stagnation portion of the flow path of the ink is excellent, such that ejection stability can be further improved.

The self-dispersible pigment in which the carboxylic acid group is directly bonded to the particle surface of the pigment is prepared by various methods. In view of productivity or cost, it is preferable to use a self-dispersible pigment prepared by an oxidation treatment method such as a method of treating a pigment with an oxidant such as hydrogen peroxide or hypochlorous acid or a method of treating a pigment with ozone gas.

Whether or not the carboxylic acid group is directly bonded to the particle surface of the pigment can be confirmed, for example, as follows. A pigment dispersion liquid containing the self-dispersible pigment is put into a sealed vessel and stored in a high temperature environment for a predetermined time (for example, at 60° C. for 2 weeks). Thereafter, the self-dispersible pigment is precipitated by centrifugation, and a supernatant is separated. The separated supernatant is analyzed by ion chromatography. Similarly, the pigment dispersion liquid before storage is subjected to centrifugation, and a separated supernatant is analyzed by ion chromatography. Whether or not low-molecular weight organic carboxylic acids such as formic acid, acetic acid and oxalic acid are increased by storage is confirmed from these analysis results. When an increase of the organic carboxylic acids is recognized, it can be judged that the carboxylic acid group is directly bonded to the particle surface of the pigment. It is, of course, possible to confirm whether or not the carboxylic acid group is directly bonded to the particle surface of the pigment using the pigment extracted from the ink using an appropriate method.

The surface charge amount (mmol/g) of the self-dispersible pigment can be used as an index indicating an amount of the anionic group in the self-dispersible pigment. The surface charge amount of the self-dispersible pigment used in the ink is 0.40 mmol/g or less and preferably 0.18 mmol/g or more to 0.30 mmol/g or less. When the surface charge amount is less than 0.18 mmol/g, the aggregation property of the pigment is weak, such that an effect of increasing the optical density of the image may be slightly deteriorated. Meanwhile, when the surface charge amount is more than 0.30 mmol/g, since the aggregation property of the pigment is strong, ejection stability of the ink may be slightly deteriorated.

The surface charge amount of the self-dispersible pigment can be measured by colloid titration. In Example to be described below, a surface charge amount of a self-dispersible pigment in a pigment dispersion liquid was measured using an automatic potentiometric titrator (trade name "AT-510", manufactured by Kyoto Electronics Manufacturing Co., Ltd.) installed with a flow potentiometric titration unit (PCD-500) by colloid titration that uses a potential difference. More specifically, after the pigment dispersion liquid was diluted about 300 times (based on mass) with pure water, if necessary, a pH was adjusted to about 10 using potassium hydroxide, and potentiometric titration was performed using methyl glycol chitosan (5 mmol/L) as a titration reagent. Of course, the surface charge amount can also be measured using a pigment extracted from the ink by a suitable method.

(Nonionic Surfactant)

The ink contains the nonionic surfactant. Examples of the nonionic surfactant can include hydrocarbon based surfactants such as ethylene oxide adducts of acetylene glycol and polyoxyethylenealkyl ether; fluorine based surfactants such as perfluoroalkylethylene oxide adducts; silicone based surfactants such as polyether modified siloxane compounds and the like. However, in the case of using a silicone based surfactant such as a siloxane compound or a polyoxyethylene-polyoxypropylene block copolymer type surfactant, it is preferable that a content thereof is significantly small (0.05% by mass or less) or these surfactants are not used.

It is preferable that a content (% by mass) of nonionic surfactant in the ink is 0.01 times or more to 0.50 times or less as a mass ratio with respect to the content (% by mass) of the self-dispersible pigment. When the mass ratio is less than 0.01 times, since the content of the nonionic surfactant is excessively small as compared to the self-dispersible pigment, an effect of improving ejection stability may be slightly deteriorated. Meanwhile, when the mass ratio is 0.50 times or more, the content of the nonionic surfactant is excessively large as compared to the self-dispersible pigment. For this reason, wettability of the ink to the recording medium is likely to be increased, and aggregation of the pigment may be excessively suppressed. Therefore, the self-dispersible pigment is highly likely to be immersed in the recording medium in a depth direction, and the optical density of the image may be slightly decreased.

An HLB value of the nonionic surfactant obtained by a Griffin method is preferably 10.0 or more and more preferably 18.0 or less. The HLB value by the Griffin method can be calculated from Equation, "HLB value=20×(Formula weight of a hydrophilic group of a surfactant)/(Molecular weight of the surfactant)". The HLB value obtained by the Griffin method is a physical property value indicating a degree of hydrophilicity or lipophilicity of the surfactant and is a value in a range of 0.0 to 20.0. The smaller the HLB value, the higher the lipophilicity, and the larger the HLB value, the higher the hydrophilicity. When the HLB value of the nonionic surfactant is less than 10.0, ability of imparting hydrophilicity to an adsorbed aggregate is low, and it may be difficult to flow the thickened ink. For this reason, it may be difficult to sufficiently improve ejection stability of the ink.

It is preferable that the nonionic surfactant is a compound represented by the following General Formula (1).

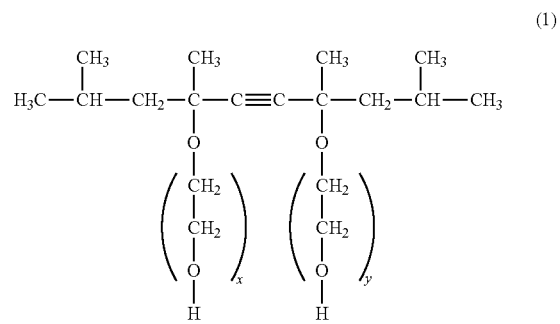

(In General Formula (1), x and y are each the number of added ethylene oxide groups.)

The compound represented by General Formula (1) is rapidly oriented to an interface, particularly, the particle surface of the pigment. For this reason, the compound is rapidly oriented to the ink thickened in the stagnation portion or meniscus portion to effectively suppress the ink from being newly thickened, such that ejection stability of the ink can be further improved. In General Formula (1), it is preferable that x+y is 1.3 or more to 10.0 or less. When x+y is less than 1.3, ability of imparting hydrophilicity to the adsorbed aggregate is low, and it may be difficult to flow the thickened ink. For this reason, the effect of improving ejection stability of the ink may be slightly deteriorated. Meanwhile, when x+y is more than 10.0, hydrophilicity may be excessively high, and orientation to the thickened ink is delayed, such that the effect of improving ejection stability of the ink may be slightly deteriorated.

(Aqueous Medium)

The ink used in the ink jet recording method according to the present invention is aqueous ink containing at least water as an aqueous medium. Water or an aqueous medium corresponding to a mixed solvent of water and a water-soluble organic solvent can be contained in the ink. It is preferable to use deionized water or ion-exchange water as the water. A content (% by mass) of the water in the aqueous ink is preferably 50.0% by mass or more to 95.0% by mass or less, based on the total mass of the ink. Further, a content (% by mass) of the water-soluble organic solvent in the aqueous ink is preferably 3.0% by mass or more to 50.0% by mass or less, based on the total mass of the ink. As the water-soluble organic solvent, any water-soluble organic solvent can be used as long as it can be used in the ink for ink jet. For example, alcohols, (poly)alkylene glycols, glycol ethers, nitrogen-containing compounds, sulfur-containing compounds can be used.

(Other Additives)

If necessary, various additives such as a resin, a defoaming agent, other surfactants, a pH adjusting agent, a viscosity modifier, a rust preventing agent, an antiseptic, an antifungal agent, an antioxidant and a reduction inhibitor in addition to the above-mentioned components may be contained in the ink.

EXAMPLE

Hereinafter, the present invention will be described in more detail through Examples and Comparative Examples, but the present invention is not limited to the following Examples as long as the present invention does not depart from the gist thereof. Unless otherwise specified, the terms "part(s)" and "%" indicating component amounts are based on mass.

<Preparation of Pigment Dispersion Liquid>

(Surface Charge Amount of Self-Dispersible Pigment)

A surface charge amount of a self-dispersible pigment in a pigment dispersion liquid was measured by potentiometric titration using an automatic potentiometric titrator installed with a flow potentiometric titration unit (PCD-500) and using methyl glycol chitosan (5 mmol/L) as a titration reagent. As the automatic potentiometric titrator, trade name "AT-510" (manufactured by Kyoto Electronics Co., Ltd.) was used.

(Pigment Dispersion Liquids 1 to 6 and 15)

Carbon black (specific surface area: 220 $m^2$/g, DBP oil absorption amount: 105 mL/100 g) was preliminarily dispersed in ion exchange water, and then ozone treatment illustrated in Table 1 was performed thereon. Thereafter, after circulating the mixture for 3 hours using a liquid-liquid collision type dispersing machine while adjusting a pH of the mixture to about 7 by adding potassium hydroxide thereto, the resultant was purified by ultrafiltration. Next, the pH was adjusted to 10.0 using an aqueous solution of potassium hydroxide, thereby obtaining a self-dispersible pigment in which a —COOK group was bonded to a particle surface of carbon black. A content of the pigment was adjusted by adding a suitable amount of water thereto, thereby obtaining pigment dispersion liquids 1 to 6 and 15 in which the content of the pigment was 15.0%.

TABLE 1

Preparation conditions and properties of pigment dispersion liquids 1 to 6 and 15

| Pigment Dispersion Liquid | Ozone Treatment Time (hour) | Surface Charge Amount (mmol/g) |
|---|---|---|
| 1 | 5.0 | 0.25 |
| 2 | 8.0 | 0.40 |
| 3 | 3.4 | 0.17 |
| 4 | 3.6 | 0.18 |
| 5 | 6.0 | 0.30 |
| 6 | 6.2 | 0.31 |
| 15 | 8.2 | 0.41 |

(Pigment Dispersion Liquids 7 to 12 and 16)

A solution in which 5.0 g of concentrated hydrochloric acid was dissolved in 5.5 g of water was cooled to 5° C., and in this state, 4-aminophthalic acid was added thereto in a use amount illustrated in Table 2. A vessel charged with this solution was put into an ice bath and stirred, and a solution obtained by dissolving 1.8 g of sodium nitrite in 9.0 g of ion exchange water (5° C.) was added thereto while maintaining a temperature of the solution to 10° C. or less. After stirring for 15 minutes, 6.0 g of carbon black (specific surface area: 220 $m^2$/g, DBP oil absorption amount: 105 mL/100 g) was added thereto under the stirring, and stirring was additionally performed for 15 minutes, thereby obtaining slurry. The obtained slurry was filtered with filter paper (trade name: "Standard filter paper No. 2", manufactured by Advantec), and particles were sufficiently washed with water and dried in an oven at 110° C. Thereafter, sodium ions were replaced by potassium ion by an ion exchange method, thereby obtaining a self-dispersible pigment in which a —$C_6H_3$—(COOK)$_2$ group was bonded to a particle surface of carbon black. A content of the pigment was adjusted by adding a suitable amount of water thereto, thereby obtaining pigment dispersion liquids 7 to 12 and 16 in which the content of the pigment was 15.0%.

TABLE 2

Preparation conditions and properties of pigment dispersion liquids 7 to 12 and 16

| Pigment Dispersion Liquid | Use amount of 4-aminophthalic acid (g) | Surface Charge Amount (mmol/g) |
|---|---|---|
| 7 | 0.91 | 0.25 |
| 8 | 1.46 | 0.40 |
| 9 | 0.62 | 0.17 |
| 10 | 0.66 | 0.18 |
| 11 | 1.10 | 0.30 |
| 12 | 1.13 | 0.31 |
| 16 | 1.50 | 0.41 |

(Pigment Dispersion Liquid 13)

A styrene-acrylic acid copolymer having an acid value of 160 mgKOH/g and a weight average molecular weight of 10,000 was neutralized with a 10% aqueous solution of potassium hydroxide. A mixture was obtained by mixing 10.0 parts of carbon black (specific surface area: 220 $m^2$/g, DBP oil absorption amount: 105 mL/100 g), 5.0 parts (solid content) of the neutralized styrene-acrylic acid copolymer and 85.0 parts of ion exchange water with each other. After dispersing the obtained mixture for 1 hour using a sand grinder, coarse particles were removed by centrifugation. Further, the resultant was subjected to pressure-filtration using a microfilter (manufactured by FUJIFILM Corporation) having a pore size of 3.0 µm, thereby obtaining a pigment dispersion liquid 13 in a state in which carbon black was dispersed in water by a resin. A content of a pigment in the pigment dispersion liquid 13 was 15.0%, and a content of a resin dispersant was 7.5%.

(Pigment Dispersion Liquid 14)

A mixture was obtained by mixing 15.0 parts of carbon black (specific surface area: 220 m$^2$/g, DBP oil absorption amount: 105 mL/100 g), 2.0 parts of an anionic surfactant (trade name: "Pionin A-51-B", effective concentration: 70%, manufactured by Takemoto Oil & Fat Co., Ltd.) and 83.0 parts of ion exchange water. After dispersing the obtained mixture for 1 hour using a sand grinder, coarse particles were removed by centrifugation. Further, the resultant was subjected to pressure-filtration using a microfilter (manufactured by FUJIFILM Corporation) having a pore size of 3.0 µm, thereby obtaining a pigment dispersion liquid 14 in a state in which carbon black was dispersed in water by the anionic surfactant. A content of a pigment in the pigment dispersion liquid 14 was 15.0%, and a content of the anionic surfactant was 1.4%.

<Synthesis of Resin>

(Urethane Resin 1)

A 4-necked flask equipped with a stirrer, a thermometer, a nitrogen gas introducing tube and a reflux tube was prepared. Here, 32.0 parts of isophorone diisocyanate, 24.2 parts of hexamethylene diisocyanate, 111.2 parts of polypropylene glycol having a number average molecular weight of 2,000, 28.7 parts of dimethylol propionic acid and 300.0 parts of methyl ethyl ketone were added thereto. In addition, a reaction was carried out at 80° C. for 6 hours under a nitrogen gas atmosphere. Thereafter, 3.8 parts of trimethylolpropane (cross-linking agent) was added thereto, and a reaction was carried out at 80° C. until the presence of an isocyanate group was not confirmed by Fourier-transform infrared spectrometer (FT-IR). Thereafter, the resultant was cooled down to 40° C., ion exchange water was added thereto, and an aqueous solution of potassium hydroxide was added thereto while stirring at a high speed using a homomixer. Methyl ethyl ketone was removed by distillation from this solution under heating and reduced pressure, thereby preparing a liquid containing a urethane resin 1 in which a content of the resin was 20.00%. An acid value of the urethane resin 1 was 60 mgKOH/g and a weight average molecular weight thereof measured by gel permeation chromatography was 35,000.

(Acrylic Resin 1)

An acrylic resin 1 was synthesized by copolymerizing 81.0 parts of styrene and 19.0 parts of acrylic acid using a general method. A carboxylic acid group was neutralized by potassium hydroxide in a molar amount equivalent to an acid value of the acrylic resin 1, and a suitable amount of pure water was added thereto, thereby preparing a liquid containing the acrylic resin 1 in which a content of the resin was 20.00%. An acid value of the acrylic resin 1 was 148 mgKOH/g and a weight average molecular weight thereof measured by gel permeation chromatography was 10,000.

<Preparation of Surfactant>

Properties of surfactants are illustrated in Table 3. In Table 3, "Acetylenol E100", "Acetylenol E00", "Acetylenol E40" and "Acetylenol E60" are all trade names of nonionic surfactants manufactured by Kawaken Fine Chemicals Co., Ltd. In Table 3, "NIKKOL BS-4", "NIKKOL BC-20", "NIKKOL BL-25" and "NIKKOL BO-50" are all trade names of nonionic surfactants manufactured by Nikko Chemicals Co., Ltd.

TABLE 3

Properties of surfactants

| Surfactant | Structure | Number of moles of Added Ethylene Oxide Group | HLB Value |
|---|---|---|---|
| Acetylenol E100 | Ethylene oxide Adduct of Acetylene Glycol | 10 | 13.3 |
| Acetylenol E00 | Acetylene Glycol | 0 | 0.0 |
| Acetylenol E40 | Ethylene oxide Adduct of Acetylene Glycol | 4 | 8.8 |
| Acetylenol E60 | Ethylene oxide Adduct of Acetylene Glycol | 6 | 10.8 |
| NIKKOL BS-4 | Polyoxyethylene Stearyl Ether | 4 | 9.0 |
| NIKKOL BC-20 | Polyoxyethylene Cetyl Ether | 20 | 15.7 |
| NIKKOL BL-25 | Polyoxyethylene Lauryl Ether | 25 | 17.0 |
| NIKKOL BO-50 | Polyoxyethylene Oleyl Ether | 50 | 18.0 |

<Preparation of Ink>

Respective components (unit: %) illustrated in an upper portion of Table 4 were mixed and sufficiently stirred and then subjected to pressure-filtration using a cellulose acetate filter (manufactured by Advantec) having a pore size of 3.0 µm, thereby preparing respective inks. Contents S (%) of surfactants, contents P (%) of pigments and S/P values (times) are illustrated in a lower end of Table 4.

TABLE 4

Composition and properties of ink

| | Ink | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Pigment Dispersion Liquid No. | 1 | 1 | 1 | 1 | 2 | 3 | 4 | 5 | 6 | 1 | 1 | 1 | 1 |
| Pigment Dispersion Liquid | 40.0 | 40.0 | 40.0 | 40.0 | 40.0 | 40.0 | 40.0 | 40.0 | 40.0 | 40.0 | 40.0 | 40.0 | 40.0 |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 5.0 | 5.0 | 5.0 | 5.0 | 5.0 | 5.0 | 5.0 | 5.0 | 5.0 | 5.0 | 5.0 | 5.0 | 5.0 |
| 1,2-Hexanediol | 5.0 | 5.0 | 5.0 | 5.0 | 5.0 | 5.0 | 5.0 | 5.0 | 5.0 | 5.0 | 5.0 | 5.0 | 5.0 |
| Acetylenol E100 | 1.0 | 1.0 | 1.0 | | 1.0 | 1.0 | 1.0 | 1.0 | 1.0 | | | | |
| Acetylenol E00 | | | | | | | | | | 1.0 | | | |
| Acetylenol E40 | | | | | | | | | | | 1.0 | | |
| Acetylenol E60 | | | 1.0 | | | | | | | | | 1.0 | |
| NIKKOL BS-4 | | | | | | | | | | | | | 1.0 |

TABLE 4-continued

Composition and properties of ink

| | | | | | | | | | | | | | |
|---|---|---|---|---|---|---|---|---|---|---|---|---|---|
| NIKKOL BC-20 | | | | | | | | | | | | | |
| NIKKOL BL-25 | | | | | | | | | | | | | |
| NIKKOL BO-50 | | | | | | | | | | | | | |
| Sodium Dodecylbenzene Sulfonate | | | | | | | | | | | | | |
| Liquid Containing Urethane Resin 1 | | 10.0 | | 5.0 | | | | | | | | | |
| Liquid Containing Acrylic Resin 1 | | | 10.0 | 5.0 | | | | | | | | | |
| Ion Exchange Water | 39.0 | 29.0 | 29.0 | 29.0 | 39.0 | 39.0 | 39.0 | 39.0 | 39.0 | 39.0 | 39.0 | 39.0 | 39.0 |
| Content S (%) of Surfactant | 1.0 | 1.0 | 1.0 | 1.0 | 1.0 | 1.0 | 1.0 | 1.0 | 1.0 | 1.0 | 1.0 | 1.0 | 1.0 |
| Content P (%) of Pigment | 6.0 | 6.0 | 6.0 | 6.0 | 6.0 | 6.0 | 6.0 | 6.0 | 6.0 | 6.0 | 6.0 | 6.0 | 6.0 |
| S/P Value (times) | 0.17 | 0.17 | 0.17 | 0.17 | 0.17 | 0.17 | 0.17 | 0.17 | 0.17 | 0.17 | 0.17 | 0.17 | 0.17 |

| | Ink | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| Pigment Dispersion Liquid No. | 1 | 1 | 1 | 1 | 1 | 1 | 1 | 7 | 7 | 7 | 7 | 8 |
| Pigment Dispersion Liquid | 40.0 | 40.0 | 40.0 | 40.0 | 40.0 | 40.0 | 40.0 | 40.0 | 40.0 | 40.0 | 40.0 | 40.0 |
| Glycerin | 10.0 | 10.0 | 10.0 | 10.0 | 10.0 | 10.0 | 10.0 | 10.0 | 10.0 | 10.0 | 10.0 | 10.0 |
| Triethylene glycol | 5.0 | 5.0 | 5.0 | 5.0 | 5.0 | 5.0 | 5.0 | 5.0 | 5.0 | 5.0 | 5.0 | 5.0 |
| 1,2-Hexanediol | 5.0 | 5.0 | 5.0 | 5.0 | 5.0 | 5.0 | 5.0 | 5.0 | 5.0 | 5.0 | 5.0 | 5.0 |
| Acetylenol E100 | | | | 0.05 | 0.06 | 3.00 | 3.05 | 1.0 | 1.0 | 1.0 | | 1.0 |
| Acetylenol E00 | | | | | | | | | | | | |
| Acetylenol E40 | | | | | | | | | | | | |
| Acetylenol E60 | | | | | | | | | | | 1.0 | |
| NIKKOL BS-4 | | | | | | | | | | | | |
| NIKKOL BC-20 | 1.0 | | | | | | | | | | | |
| NIKKOL BL-25 | | 1.0 | | | | | | | | | | |
| NIKKOL BO-50 | | | 1.0 | | | | | | | | | |
| Sodium Dodecylbenzene Sulfonate | | | | | | | | | | | | |
| Liquid Containing Urethane Resin 1 | | | | | | | | | | 10.0 | | 5.0 |
| Liquid Containing Acrylic Resin 1 | | | | | | | | | | | 10.0 | 5.0 |
| Ion Exchange Water | 39.0 | 39.0 | 39.0 | 39.95 | 39.94 | 37.00 | 36.95 | 39.0 | 29.0 | 29.0 | 29.0 | 39.0 |
| Content S (%) of Surfactant | 1.0 | 1.0 | 1.0 | 0.05 | 0.06 | 3.00 | 3.05 | 1.0 | 1.0 | 1.0 | 1.0 | 1.0 |
| Content P (%) of Pigment | 6.0 | 6.0 | 6.0 | 6.0 | 6.0 | 6.0 | 6.0 | 6.0 | 6.0 | 6.0 | 6.0 | 6.0 |
| S/P Value (times) | 0.17 | 0.17 | 0.17 | 0.008 | 0.010 | 0.500 | 0.508 | 0.17 | 0.17 | 0.17 | 0.17 | 0.17 |

| | Ink | | | | | | | | | | |
|---|---|---|---|---|---|---|---|---|---|---|---|
| | 26 | 27 | 28 | 29 | 30 | 31 | 32 | 33 | 34 | 35 | 36 |
| Pigment Dispersion Liquid No. | 9 | 10 | 11 | 12 | 8 | 13 | 14 | 15 | 16 | 1 | 1 |
| Pigment Dispersion Liquid | 40.0 | 40.0 | 40.0 | 40.0 | 40.0 | 40.0 | 40.0 | 40.0 | 40.0 | 40.0 | 40.0 |
| Glycerin | 10.0 | 10.0 | 10.0 | 10.0 | 10.0 | 10.0 | 10.0 | 10.0 | 10.0 | 10.0 | 10.0 |
| Triethylene glycol | 5.0 | 5.0 | 5.0 | 5.0 | 5.0 | 5.0 | 5.0 | 5.0 | 5.0 | 5.0 | 5.0 |
| 1,2-Hexanediol | 5.0 | 5.0 | 5.0 | 5.0 | 5.0 | 5.0 | 5.0 | 5.0 | 5.0 | 5.0 | 5.0 |
| Acetylenol E100 | 1.0 | 1.0 | 1.0 | 1.0 | | 1.0 | 1.0 | 1.0 | 1.0 | | |
| Acetylenol E00 | | | | | | | | | | | |
| Acetylenol E40 | | | | | | | | | | | |
| Acetylenol E60 | | | | | | | | | | | |
| NIKKOL BS-4 | | | | | 3.05 | | | | | | |
| NIKKOL BC-20 | | | | | | | | | | | |
| NIKKOL BL-25 | | | | | | | | | | | |
| NIKKOL BO-50 | | | | | | | | | | | |
| Sodium Dodecylbenzene Sulfonate | | | | | | | | | | | 1.0 |
| Liquid Containing Urethane Resin 1 | | | | | | | | | | | |
| Liquid Containing Acrylic Resin 1 | | | | | | | | | | | |
| Ion Exchange Water | 39.0 | 39.0 | 39.0 | 39.0 | 36.95 | 39.0 | 39.0 | 39.0 | 39.0 | 40.0 | 39.0 |
| Content S (%) of Surfactant | 1.0 | 1.0 | 1.0 | 1.0 | 3.05 | 1.0 | 1.6 | 1.0 | 1.0 | 0.0 | 1.0 |
| Content P (%) of Pigment | 6.0 | 6.0 | 6.0 | 6.0 | 6.0 | 6.0 | 6.0 | 6.0 | 6.0 | 6.0 | 6.0 |
| S/P Value (times) | 0.17 | 0.17 | 0.17 | 0.17 | 0.508 | 0.17 | 0.27 | 0.17 | 0.17 | 0.00 | 0.17 |

<Evaluation>

An ink storage portion (not illustrated) of an ink jet recording apparatus having main portions illustrated in FIG. 5 were filled with each of the inks, and the following evaluations were performed in an environment at a temperature of 25° C. and a relative humidity of 50%. As a recording head, a line-type recording head having a configuration illustrated in FIG. 6 was used. This recording head includes first and second flow paths communicating between an ejection orifice and an ejection element with respect to one nozzle, and flows ink in the first flow path to the second flow path using a pump. The number of nozzles per one row of the nozzles is 1024, a nozzle density is 600 dpi, and an ejection amount of the ink per nozzle is 5 ng. In the following evaluation, a recording medium was conveyed at a speed of 15 inches/sec and an image was recorded under the conditions at which two rows of nozzle rows were used and three droplets of the ink were applied to a unit area (1/600 inches×1/600 inches). Further, a temperature of the ink in the recording head was increased to 40° C. In the present invention, as evaluation criteria for each item described below, "AA", "A" and "B" were set as acceptable levels, and "C" was set as an unacceptable level. Evaluation results are illustrated in Table 5. Further, in Reference Example 1, it was attempted to perform evaluation under the conditions at which the ink did not flow, but it was impossible to normally eject the ink.

(Optical Density)

A solid image (3 cm×2 cm) was recorded on a recording medium (plain paper) while continuously flowing the ink at a flow rate of 1.0 mm/s using the ink jet recording apparatus. As the recording medium, trade names "PB Paper" and "Canon Extra" (which were manufactured by Canon Inc.); and a trade name "Bright white" (manufactured by Hewlett-Packard) were used. After the solid image was recorded, the recording medium was kept and dried in an environment of a temperature at 25° C. and a relative humidity of 50% for 1 day, and then, an optical density of the image was measured using a reflection densitometer (trade name: "Macbeth RD-918", manufactured by GretagMacbeth). An average value of optical densities of the images recorded on three kinds of recording media was calculated, and the optical density was evaluated according to the following evaluation criteria.

AA: The average value of the optical densities was 1.40 or more.

A: The average value of the optical densities was 1.35 or more to less than 1.40.

B: The average value of the optical densities was 1.30 or more to less than 1.35.

C: The average value of the optical densities was less than 1.30.

(Ejection Stability)

A solid image was continuously recorded on entire surfaces of 10 sheets of A4 size recording media (plain paper) using all nozzles constituting a line head while continuously flowing the ink at a flow rate of 1.0 mm/s using the ink jet recording apparatus. As the recording medium, a trade name "high resolution paper HR-101S" (manufactured by Canon Inc.) was used. After recording the image, the recording was paused for 1 hour by capping surfaces of ejection orifices of a recording head while continuously flowing the ink. Thereafter, a solid image corresponding to 10 sheets was recorded under conditions similar to those described above. After this cycle was repeated 500 times, a suction recovery operation was performed. An ejection state of the ink from each nozzle was confirmed, and ejection stability was evaluated according to the following evaluation criteria.

AA: The ejection state became a state in which the ink was normally ejected from all the ejection orifices by performing the suction recovery operation one time.

A: When the suction recovery operation was performed one time, there was an ejection orifice in which non-ejection or deflection of ejection occurred, but the ejection state became a state in which the ink was normally ejected from all the ejection orifices by additionally performing the suction recovery operation one time.

B: When the suction recovery operation was performed two times, there was an ejection orifice in which non-ejection or deflection of ejection occurred, but the ejection state became a state in which the ink was normally ejected from all the ejection orifices by additionally performing the suction recovery operation one time.

C: Even after the suction recovery operation was performed three times, there was an ejection orifice in which non-ejection or deflection of ejection occurred.

TABLE 5

Evaluation conditions and evaluation results

| | | | Evaluation Conditions | | Evaluation Results | |
|---|---|---|---|---|---|---|
| | | | Flow of Ink | Ink No. | Optical Density | Ejection Stability |
| Example | | 1 | Presence | 1 | AA | AA |
| | | 2 | Presence | 2 | AA | AA |
| | | 3 | Presence | 3 | AA | AA |
| | | 4 | Presence | 4 | AA | AA |
| | | 5 | Presence | 5 | AA | A |
| | | 6 | Presence | 6 | A | AA |
| | | 7 | Presence | 7 | AA | AA |
| | | 8 | Presence | 8 | AA | AA |
| | | 9 | Presence | 9 | AA | A |
| | | 10 | Presence | 10 | AA | A |
| | | 11 | Presence | 11 | AA | A |
| | | 12 | Presence | 12 | AA | AA |
| | | 13 | Presence | 13 | AA | B |
| | | 14 | Presence | 14 | AA | A |
| | | 15 | Presence | 15 | AA | A |
| | | 16 | Presence | 16 | AA | A |
| | | 17 | Presence | 17 | AA | A |
| | | 18 | Presence | 18 | AA | AA |
| | | 19 | Presence | 19 | AA | AA |
| | | 20 | Presence | 20 | A | AA |
| | | 21 | Presence | 21 | AA | A |
| | | 22 | Presence | 22 | AA | A |
| | | 23 | Presence | 23 | AA | A |
| | | 24 | Presence | 24 | AA | A |
| | | 25 | Presence | 25 | AA | B |
| | | 26 | Presence | 26 | A | A |
| | | 27 | Presence | 27 | AA | A |
| | | 28 | Presence | 28 | AA | A |
| | | 29 | Presence | 29 | AA | B |
| | | 30 | Presence | 30 | A | B |
| Comparative Example | | 1 | Presence | 31 | C | C |
| | | 2 | Presence | 32 | AA | C |
| | | 3 | Presence | 33 | AA | C |
| | | 4 | Presence | 34 | AA | C |
| | | 5 | Presence | 35 | AA | C |
| | | 6 | Presence | 36 | AA | C |
| Reference Example | | 1 | Absence | 1 | — | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-133625, filed Jul. 7, 2017, and Japanese Patent Application No. 2018-112736, filed Jun. 13, 2018, which are hereby incorporated by reference herein in their entirety.

What is claimed is:

1. An ink jet recording method of recording an image by ejecting ink from a recording head including (i) an ejection orifice ejecting the ink, (ii) an ejection element generating energy for ejecting the ink, and (iii) first and second flow paths that communicate between the ejection orifice and the ejection element and in which the ink flows, the ink jet recording method comprising:

an ejection step of ejecting the ink from the ejection orifice; and a flow step of flowing the ink in the first flow path to the second flow path separately from the ejection step, wherein the ink is an aqueous ink comprising a self-dispersible pigment in which an anionic group is bonded to a particle surface of the pigment directly or through another atomic group, and a nonionic surfactant, and wherein the self-dispersible pigment has a surface charge amount of 0.40 mmol/g or less.

2. The ink jet recording method according to claim 1, wherein the self-dispersible pigment has a surface charge amount of 0.18 mmol/g or more to 0.30 mmol/g or less.

3. The ink jet recording method according to claim 1, wherein an HLB value of the nonionic surfactant that is obtained by a Griffin method is 10.0 or more.

4. The ink jet recording method according to claim 1, wherein the nonionic surfactant is a compound represented by the following General Formula (1):

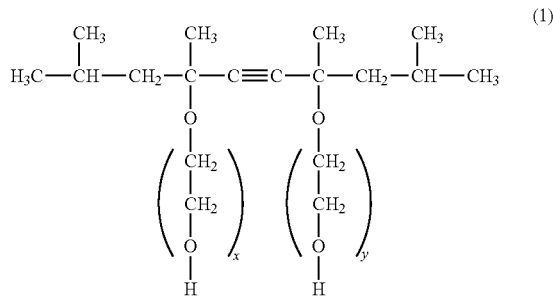

wherein, in General Formula (1), x and y are each the number of added ethylene oxide groups.

5. The ink jet recording method according to claim 1, wherein a content (% by mass) of the nonionic surfactant in the ink is 0.01 times or more to 0.50 times or less, as a mass ratio, with respect to a content (% by mass) of the self-dispersible pigment.

6. The ink jet recording method according to claim 1, wherein, in the self-dispersible pigment, the anionic group is directly bonded to the particle surface of the pigment.

7. The ink jet recording method according to claim 1, wherein the recording head comprises a plurality of the ejection orifices, a plurality of first flow paths, and a plurality of second flow paths,
wherein each of the plurality of first flow paths communicates with an inlet path, and
wherein each of the plurality of second flow paths communicates with an outlet path.

8. The ink jet recording method according to claim 1, wherein the flow step is a step of flowing the ink in the first flow path to the second flow path without discharging the ink from the ejection orifice.

9. The ink jet recording method according to claim 1, further comprising a recovery step of the recording head, wherein, during performing of the recovery step, the flow step is stopped.

10. The ink jet recording method according to claim 1, wherein, in the flow step, the ink flows in a direction that crosses the ink-ejecting direction.

11. The ink jet recording method according to claim 1, wherein, in the flow step, the ink flows from the first flow path to the second flow path by a flowing unit separately from the ejection element.

12. The ink jet recording method according to claim 1, wherein, in the flow step, the ink flows from the first flow path to the second flow path by a pressure difference.

13. The ink jet recording method according to claim 12, wherein a flow rate (mm/s) of the ink is 0.1 mm/s or more to 10.0 mm/s or less.

14. The ink jet recording method according to claim 1, wherein, in the flow step, the ink flows intermittently from the first flow path to the second flow path.

15. The ink jet recording method according to claim 14, wherein a flow rate (mm/s) of the ink is 1.0 mm/s or more to 10.0 mm/s or less.

16. The ink jet recording method according to claim 1, wherein the recording head is a line head.

17. The ink jet recording method according to claim 16, wherein the line head has a plurality of ejection element substrates arranged in a linear shape.

18. The ink jet recording method according to claim 1, wherein the ejection element generates thermal energy for ejecting the aqueous ink.

19. An ink jet recording apparatus comprising:
a recording head including (i) an ejection orifice ejecting the ink, (ii) an ejection element generating energy for ejecting the ink, and (iii) first and second flow paths that communicate between the ejection orifice and the ejection element and in which the ink flows; and
a flowing unit flowing the ink in the first flow path to the second flow path separately from the ejection element,
wherein the ink is an aqueous ink comprising a self-dispersible pigment in which an anionic group is bonded to a particle surface of the pigment directly or through another atomic group, and a nonionic surfactant, and
wherein the self-dispersible pigment has a surface charge amount of 0.40 mmol/g or less.

* * * * *